Feb. 21, 1928.
H. D. PENNEY
1,660,272
SOUND TRANSMISSION FOR PHONOGRAPHS
Filed Feb.1, 1922
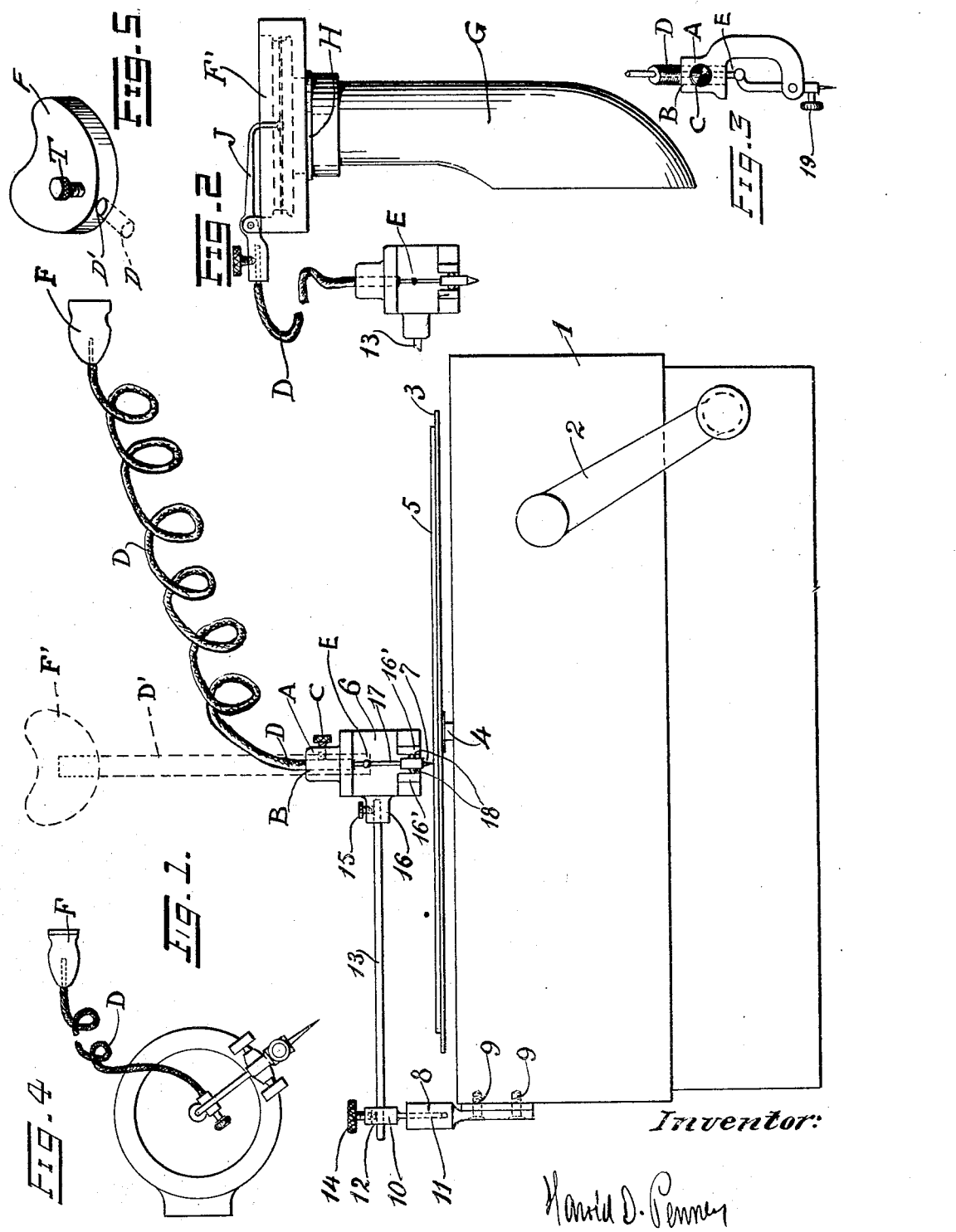
Inventor:
Harold D. Penney Patented Feb. 21, 1928.

1,660,272

UNITED STATES PATENT OFFICE.

HAROLD D. PENNEY, OF PELHAMWOOD, NEW YORK.

SOUND TRANSMISSION FOR PHONOGRAPHS.

Application filed February 1, 1922. Serial No. 533,308.

My present invention relates to an improvement in sound transmission means in connection with phonographs, and has for its principal object the utilization of means whereby deaf, or partially deaf, persons may be enabled to hear music, etc., through the medium of vibrant transmission of sound from a phonograph record through a solid material, directly to the head structure, either through the medium of the defective ear structures, in the case of partially deaf persons or, in the case of totally deaf persons, through the medium of the teeth.

One of the advantages of my present device may be considered from an educational standpoint, wherein persons normally born without ear structure, or defective mechanical ear structures, may be enabled to apprehend sounds, from phonograph records, through the auditory nerve, by vibrating the bony structure of the head. It is obvious that this last noted advantage is a very great one, and I apprehend, as tests have already shown, that young deaf and dumb persons may be taught to speak through this medium, by means of records, especially prepared, and word charts operated in conjunction therewith.

The difficulty of most persons born both deaf and dumb is due to the fact that while they may be deaf, the auditory nerves and vocal cords may be normal, but owing to the inability to hear through defective mechanical ear structures, they are unable to vocalize sounds.

It is also obvious from a careful consideration of this condition that where the vocal cords are in normal condition, that deaf persons may be taught to talk properly, for the reason that it is possible to convey through the mediums hereinafter to be described, the proper tonal qualities, volumes and inflections to the auditory nerve, whereby a deaf and dumb person may familiarize himself with such sounds, and volume of tone, through resonating the head structure.

In the case of older deaf and dumb persons where the vocal organs have become atrophied through lack of use, I apprehend that it may be rather difficult to teach them speech, but at any rate I have found by actual test that where the deafness happens through defective mechanical ear structures, such deaf persons hear music perfectly by this means, thereby affording enjoyment to such deaf persons by admitting them to the field of auditory pleasures, supplied by the vast field of phonographic endeavor, heretofore denied them.

Other objects and advantages will grow as the disclosure herein develops.

In the drawings,

Fig. 1 is a side elevation, more or less diagrammatic, of my device;

Fig. 2 is an amplification of a modified use of my device in partial structure;

Fig. 3 is a side view of my transmitter showing general details of connection; and Fig. 4 is a modified construction showing the means of attachment of the transmitter means to a standard phonograph diaphragm for use by partially deaf persons.

Fig. 5 is a perspective view of the removable mouthpiece.

In Fig. 1 there is shown a casing, generally denoted by 1, having a crank handle 2 thereon and the usual phonograph turntable 3 mounted upon a rotatable post 4, and 5 is a phonograph record shown on the table 3. It is thought, owing to the general nature of the device, that elements 1 to 5 inclusive are sufficient to indicate any standard well-known phonograph, to those skilled in the art.

The previous elements described are substantially identical with the usual phonograph, but the motor which rotates the table 3 through the post 4 is not shown, this being understood. Any motor or driving means, electrical or otherwise might be substituted for the crank handle 2 of the spring motor.

Up to the present point of disclosure the phonograph equipment may be standard. However, in the present type of device, which is a preferred form. I arrange to have a transmitter means 6 swing across the record 5 in the usual manner of phonograph diaphragms, reproducer type, but there is no tone arm used in this case, inasmuch as I desire to insulate, as much as possible, all vibrations so that when transmitted through the stylus 7, they will be sent through the transmission means later to be described, with a minimum of vibration loss.

To this end I arrange, preferably on the casing 1, a socket member 8, the same being fixed to the casing by any suitable means, such as screws 9, said socket member pivotally supporting an oscillating pintle 10 which is pivotally mounted for oscillation within the socket 8 as at 11.

At the upper end of the pintle 10 is located a bore 12 in which to receive the swing arm 13 which is held rigidly and adjustably locked by means of a thumb-nut 14 threadedly mounted into the pintle 10.

At the opposite end of the swing arm 13 is mounted my transmitter 6, said transmitter being held to the rod in preferably vertical position in the case of "lateral-cut" records, by means of a thumb screw 15 which rigidly holds the end of the rod 13 in the lug 16 of the transmitter 6.

The transmitter member 6 has at its lower end a pair of outstanding lugs 16' between which are mounted, in any suitable well known manner, a stylus or sound post, generally denoted by 17, the said stylus being pivotally swung for vibration upon pivots 18. The stylus 17 may be provided at its lower end with the usual thumb screw 19 for holding the customary type of reproducing phonograph needle 7 therein, as shown in Fig. 3, which is an enlarged view, in side elevation, of my transmitter 6.

At the upper end of the transmitter 6 is located a lug A having a bore B therein into which is inserted a covered or insulated, rigid or semi-rigid solid conductor or transmission element D, the same being held in rigid connection with the transmitter 6 by means of a thumb screw C, and in the present instance is shown coiled in a helix to give a desired amount of flexibility to the element D.

The transmission element D, as I have ascertained, may be made of any rigid or semi-rigid material. By semi-rigid I mean that it may be flexible, or if rigid, it may be unyielding and free, but it should, preferably, be solid. As an indication of what is meant, experiments have been conducted upon machines wherein the record rotates and moves laterally across the casing under a fixed non-moving reproducer or diaphragm, and in this case the rigid non-flexible transmission bar D' may be inserted into the transmitter 6 and in operation the listener may maintain an immovable position while listening; but in the case of the present utilization of my device, upon a standard phonograph mechanism wherein the record rotates on a fixed axis, I have found that I can use a rigid transmitter element D, made semiflexible by coiling, whereby the sound vibrations may be conducted to a means later to be described.

The lower end of the transmission means D or D' are extended downwardly through the supporting lug A, and extend to a point E where it is joined to the upper end of the stylus 17 in a substantially non-vibrating contact, so that when the transmitter 6 is charged with a needle and is run upon a record, the vibrations transmitted therethrough are impinged upon the lower end E of the transmission elements D or D' so that the vibrations affect the molecular structure of the flexible or rigid transmission means D or D' and the vibrations are carried along its fibres to the opposite end of the transmission means D or D' and are transferred from said transmission means to a mouth piece or tooth-grip means generally denoted by F, Figs. 1 and 5. This tooth-grip element F is fixed by suitable means, such as cementing, screwing or clamping, to the transmission elements D or D' so as to be integral therewith, in such a manner as to permit of the full transmission of the vibrations thereof from the transmission elements D or D'. In practice, I have found that the tooth-grip or head transmission element F may be made of wood, vulcanite, ivory, hard rubber or any suitable close-grained unyielding material so that when gripped between the teeth of the listener they will transmit the full vibrations unimpededly to the bony structure of the head, through the teeth, with a minimum loss of tonal quality and volume. In Fig. 5 there is shown one form of detachable mouthpiece F, and which may be of bakelite, drilled as at D' to receive the transmission means D, shown dotted, and provided with a thumb screw T whereby to clamp the mouthpiece to the means D in a firm engagement.

In the drawings, Fig. 1, I have indicated as my transmission means D, a piece of single conduit, weather-proof, copper electrical conducting wire, solid type. The wire is made in the form of a coil as shown and is covered on the outside with the usual plurality of insulating coverings, braided, or otherwise covered with a cotton covering in the usual well-known practice in electrical engineering.

The lower end of the wire is bared of its insulation and attached at E to the stylus 17 as previously described and that portion of the wire in the lug A is left with its insulation thereon thereby to be gripped by the thumb screw C, or equivalent means, pressing upon the insulation only of the wire, thereby avoiding metallic contact with the solid, interior metallic core of the transmission member D and thereby preventing short circuiting of the sound vibrations and the consequent loss of vibration at this point, to the transmitter 6. The other end of the transmission means D is bared at its point of insertion at the mouth piece F so as to afford full transmission of the sound vibration at this end.

In use, the last described mechanism permits a totally deaf operator to be seated before a machine and upon the operating of the phonograph in the usual manner, with the head transmission means F between the teeth, a full, intense vibration from the record is transmitted to the bony structure of the head with high quality, both as to tone definition and volume. In actual use, I have discovered that inflections not ordinarily heard in the usual phonograph are transmitted by this means and that music and speech are transmitted with a clearness not heretofore experienced, due to the sensitiveness of transmission means, and the direct vibrational action of the head structure, which resonates in full sympathy to the tone vibrations.

The reason for coiling the insulated wire form of transmission member D is to permit the "hearer" to be seated conveniently in front of the phonograph, and during the listening operation through the teeth, the solid wire being in coiled form is flexible and somewhat resilient, and such flexibility and resiliency thereby obtained does not compel the listener to follow the travel of the transmitter element 6 as it moves across the face of the record where the ordinary phonograph is used upon which the record table rotates upon a fixed axis. It will therefore be seen that this arrangement permits the use of the solid wire for the proper transmission of vibration and at the same time provides a flexible element for comfort to the user.

Where the recording type of machine with fixed diaphragm and laterally movable rotating disk is used, I have found it convenient to use a rigid non-flexible transmission means D' shown in dotted lines, Fig. 1, to which is attached the mouth piece F, as previously described, and in this case the operator of the machine may sit, without head movement, with the element F gripped between the teeth. I have found that where rigid transmitters D' are utilized that a wide variety of materials may be used, such as wooden rods, metal rods of all kinds, metal tubes etc., and that any type of material susceptible of being responsive to vibration may be utilized. The tonal transmission qualities vary according to their fibrous and elemental structure.

As a further modification of my device, whereby partially deaf persons, with imperfect ear structures, may listen to phonograph records through the intensification and concentration of sound vibrations, modifications are indicated in Fig. 2, wherein the transmitter E and the element D are shown as above, but the bared outer end of the element D instead of being attached to a tooth grip element F is shown attached into an ordinary reproducing phonograph diaphragm, generally denoted by F', and inasmuch as this last noted structure is generally well-known it is not necessary to describe it in detail. Instead of placing the usual type of tone arm at the rear end of the diaphragm F', I may place the rear end H of the diaphragm directly to the ear or I may place the usual type of listening horn G thereon, properly affixed at its neck H to the diaphragm and deaf people who have become partially deaf through age or disease may also enjoy music greatly intensified, but in reduced volume.

I have found in tests, that the transmission element D, Fig. 2, may be made as long as six feet and music is transmitted perfectly through the wire D and to the stylus J of the diaphragm F' and that in addition to the amplification of tone transmission by this method, I may attach a plurality of transmission means to a single stylus and permit a number of listeners, or scholars, to simultaneously enjoy a single record or lesson.

While I have disclosed in all of the foregoing, a special form of structure whereby to obtain the desired effects, I have ascertined that a simpler form of device may be made and utilized, wherein the mouth piece F (or the diaphragm F') with its integral transmission means D or D', are removably and firmly connected to the sound post of an ordinary phonograph diaphragm by any suitable means, and sound will be transmitted, both through my device and the sound amplifying chamber of the phonograph, but the volume of tone in both devices is naturally modified by this arrangement, as shown in Fig. 4.

There has not been any attempt, in this case, to present elaborate drawings by way of illustration of the varied manner of applying my device, and the drawings herein are more diagrammatic than otherwise and are intended to convey to one familiar with this art, the underlying idea herein, and modifications of structure may be made, as above indicated, without departing from the above outlined and herein claimed scope.

I am aware that heretofore some sound transmitting devices have been patented, and perhaps made, wherein the teeth were utilized to transmit sounds to the auditory nerve through the teeth and bony structure of the head, but there has not been used heretofore, as I apprehend, a device whereby the wide field of phonographic record endeavor has been utilized to bring music and education into the ken of people heretofore deprived of this pleasure or to bring this feature to a point where it may be utilized as an educational advantage and aid to persons who are so unfortunate as to be deprived of hearing.

I claim:

1. The combination with a phonograph, including a phonograph record and a transmitter, of a vibrant sound transmission means for transmitting sound vibrations to 1. The combination with a phonograph, including a phonograph record and a transmitter of a vibrant semi-flexible transmission means for transmitting sound vibrations to the head of an operator, and a detachable vibrant member mounted upon the outer end of said transmission member.

2. The combination with a phonograph, including a phonograph record and a transmitter of a vibrant semi-flexible transmission means for transmitting sound vibrations to the head of an operator, and a detachable vibrant member mounted upon the outer end of said transmission member.

3. The combination with a phonograph, including a phonograph record, a stylus and a sound box, of a sound transmission means, one end of said transmission means being affixed to the stylus of said sound box and the other end thereof having a vibrant head-tone transmitting element thereon.

4. The combination with a phonograph, including a phonograph record, a stylus and a sound box of a solid sound transmission means, one end of said transmission means being affixed to the stylus of said sound box and the other end thereof having a head-tone transmitting element thereon.

5. The combination with a phonograph, including a phonograph record, and a sound box having a stylus thereon, of detachable mouth piece means attached to said stylus whereby sound vibrations are transmitted to the head of the user.

6. The combination with a phonograph, including a phonograph record and a sound box having a stylus thereon, of means detachably attached to said stylus whereby sound vibrations are transmitted to a head vibrating element.

7. In combination with the swiveled arm of a talking machine, and a head on said arm, a sound transmitting element adapted for contact with the teeth of the user, means to secure said element to said head, and a stylus carried by said element and adapted for coaction with a sound record.

8. In combination with a swiveled arm of a talking machine, and a head on said arm, a sound transmitting element of resilient material adapted for contact with the teeth of the user, means to secure said element to said head, and a stylus carried by said element and adapted for coaction with a sound record.

HAROLD D. PENNEY.